US012780581B2

(12) United States Patent
Mikami et al.

(10) Patent No.: US 12,780,581 B2
(45) Date of Patent: Nov. 3, 2026

(54) SHEET CONVEYING APPARATUS

(71) Applicants: Prime Planet Energy & Solutions, Inc., Tokyo (JP); JTEKT CORPORATION, Aichi-ken (JP)

(72) Inventors: Masateru Mikami, Himeji (JP); Tetsuya Sato, Kobe (JP); Masayuki Hori, Himeji (JP); Toshikazu Sakei, Toyoake (JP)

(73) Assignees: PRIME PLANET ENERGY & SOLUTIONS, INC., Tokyo (JP); JTEKT CORPORATION, Aichi-ken (JP)

( * ) Notice: Subject to any disclaimer, the term of this patent is extended or adjusted under 35 U.S.C. 154(b) by 0 days.

(21) Appl. No.: 19/080,934

(22) Filed: Mar. 17, 2025

(65) Prior Publication Data

US 2025/0296796 A1 Sep. 25, 2025

(30) Foreign Application Priority Data

Mar. 22, 2024 (JP) ................................ 2024-046950

(51) Int. Cl.
*B65H 20/12* (2006.01)
*B65H 5/22* (2006.01)
*B65H 27/00* (2006.01)

(52) U.S. Cl.
CPC ............ *B65H 20/12* (2013.01); *B65H 5/226* (2013.01); *B65H 27/00* (2013.01);
(Continued)

(58) Field of Classification Search
CPC ............. B65H 20/12; B65H 2406/111; B65H 2406/1115; B65H 2406/33;
(Continued)

(56) References Cited

U.S. PATENT DOCUMENTS 6,108,936 A * 8/2000 Vuorinen ............... D21F 5/185 34/465
6,427,941 B1 * 8/2002 Hikita .................... F26B 13/16 226/185
2010/0118096 A1 5/2010 Mouri et al.
2011/0174215 A1 7/2011 Nishio et al.
(Continued)

FOREIGN PATENT DOCUMENTS

JP H10-221946 A 8/1998
JP 2006-010683 A 1/2006
(Continued)

*Primary Examiner* — Jeremy R Severson
(74) *Attorney, Agent, or Firm* — HAUPTMAN HAM, LLP

(57) ABSTRACT

A sheet conveying apparatus includes: a first conveying section that conveys a strip-shaped sheet having a first surface and a second surface, with the first surface facing downward; a turn section provided downstream of the first conveying section to turn over the sheet; and a second conveying section provided downstream of the turn section. The turn section includes a convex curved surface having its axis extending in a width direction of the sheet and turns over the sheet along the convex curved surface with the first surface facing inward. The convex curved surface includes: a small-diameter portion provided with air nozzles for injecting air; and a pair of large-diameter portions disposed on both sides of the small-diameter portion in an axis direction and extending outward in a radial direction relative to the small-diameter portion to support both ends of the sheet in the width direction.

4 Claims, 4 Drawing Sheets

(52) U.S. Cl.
CPC .............. *B65H 2301/44352* (2013.01); *B65H 2404/1317* (2013.01); *B65H 2406/111* (2013.01); *B65H 2406/122* (2013.01); *B65H 2406/33* (2013.01); *B65H 2801/72* (2013.01); *Y02E 60/10* (2013.01)

(58) Field of Classification Search
CPC ........ B65H 2406/331; B65H 2406/351; B65H 2406/35; B65H 23/24; B65H 23/32; B65H 5/228
See application file for complete search history.

(56) References Cited

U.S. PATENT DOCUMENTS

| | | | |
|---|---|---|---|
| 2017/0151814 | A1 | 6/2017 | Murotani et al. |
| 2024/0279013 | A1 | 8/2024 | Mikami et al. |

FOREIGN PATENT DOCUMENTS

| | | | |
|---|---|---|---|
| JP | 2010-132457 | A | 6/2010 |
| JP | 2010-149963 | A | 7/2010 |
| JP | 2010-182621 | A | 8/2010 |
| JP | 2010-225467 | A | 10/2010 |
| JP | 2011-147864 | A | 8/2011 |
| JP | 2014-078445 | A | 5/2014 |
| JP | 2017-100290 | A | 6/2017 |
| JP | 2017-228349 | A | 12/2017 |
| JP | 2020-050455 | A | 4/2020 |
| JP | 2023-003004 | A | 1/2023 |
| JP | 2024-117442 | A | 8/2024 |
| WO | 2010/089664 | A1 | 8/2010 |
| WO | 2022/172747 | A1 | 8/2022 |

* cited by examiner

SHEET CONVEYING APPARATUS

CROSS-REFERENCE TO RELATED APPLICATION

This application claims the benefit of priority to Japanese Patent Application No. 2024-046950 filed on Mar. 22, 2024. The entire contents of this application are hereby incorporated herein by reference.

BACKGROUND

The present disclosure relates to a sheet conveying apparatus.

For example, Japanese Patent Application Publication No. 2023-003004 (hereinafter referred to as JP 2023-003004A) discloses a drying device that dries a coating material while conveying a strip-shaped metal foil coated with the coating material. In the drying device disclosed in JP 2023-003004A, a conveyance path is folded back twice in a vertical direction so that the conveyance path is configured in three stages. In the folded-back part of the conveyance path located from the second stage to the third stage, an air turn bar with a semi-cylindrical shape is provided. In the air turn bar, the metal foil is conveyed along a semi-cylindrical outer circumference of the air turn bar such that the coating material side of the metal foil faces inward. The air turn bar is configured such that its walls are made of meshes, allowing air to be blown out through the walls. According to JP 2023-003004A, the air blown out from the air turn bar lifts the metal foil off from the air turn bar, enabling the metal foil to be conveyed while maintaining a predetermined gap with the air turn bar. Consequently, the air turn bar allows the metal foil to be folded back without any contact.

SUMMARY

In the sheet conveying apparatus disclosed in JP 2023-003004A, the coating material that coats the metal foil may be damaged if the metal foil comes into contact with the air turn bar used for turning over the foil. Herein, a sheet conveying apparatus is proposed to make it less likely for a sheet to come into contact with a turn section designed to turn over the sheet.

A sheet conveying apparatus proposed herein includes: a first conveying section configured to convey a strip-shaped sheet having a first surface and a second surface opposite to the first surface, with the first surface facing downward; a turn section provided downstream of the first conveying section and configured to turn over the sheet; and a second conveying section provided downstream of the turn section and configured to convey the sheet with the second surface facing downward. The turn section includes a convex curved surface having an axis thereof extending in a width direction of the sheet, and turns over the sheet along the convex curved surface such that the first surface faces inward. The convex curved surface includes: a small-diameter portion where air nozzles for injecting air are formed; and a pair of large-diameter portions disposed on both sides of the small-diameter portion in an axis direction and extending outward in a radial direction relative to the small-diameter portion to support both end portions of the sheet in the width direction.

According to the sheet conveying apparatus, air is injected from the air nozzles of the small-diameter portion, and both end portions of the sheet in the width direction are supported by the pair of large-diameter portions located at both ends of the small-diameter portion, thereby enabling a portion of the sheet facing the small-diameter portion to surely lift off from the small-diameter portion. This can make it less likely for the sheet to come into contact with the turn section.

DETAILED DESCRIPTION

Hereinafter, one embodiment of a sheet conveying apparatus will be described. It is apparent that the embodiment described herein is not intended to particularly limit the present invention. In addition, each drawing is a schematic diagram and does not necessarily faithfully reflect any actually implemented product. In the following, members and parts that exert the same function are denoted by the same symbol, and a redundant explanation thereof will be omitted or simplified as appropriate.

[Configuration of Sheet Conveying Apparatus]

Figure 1:
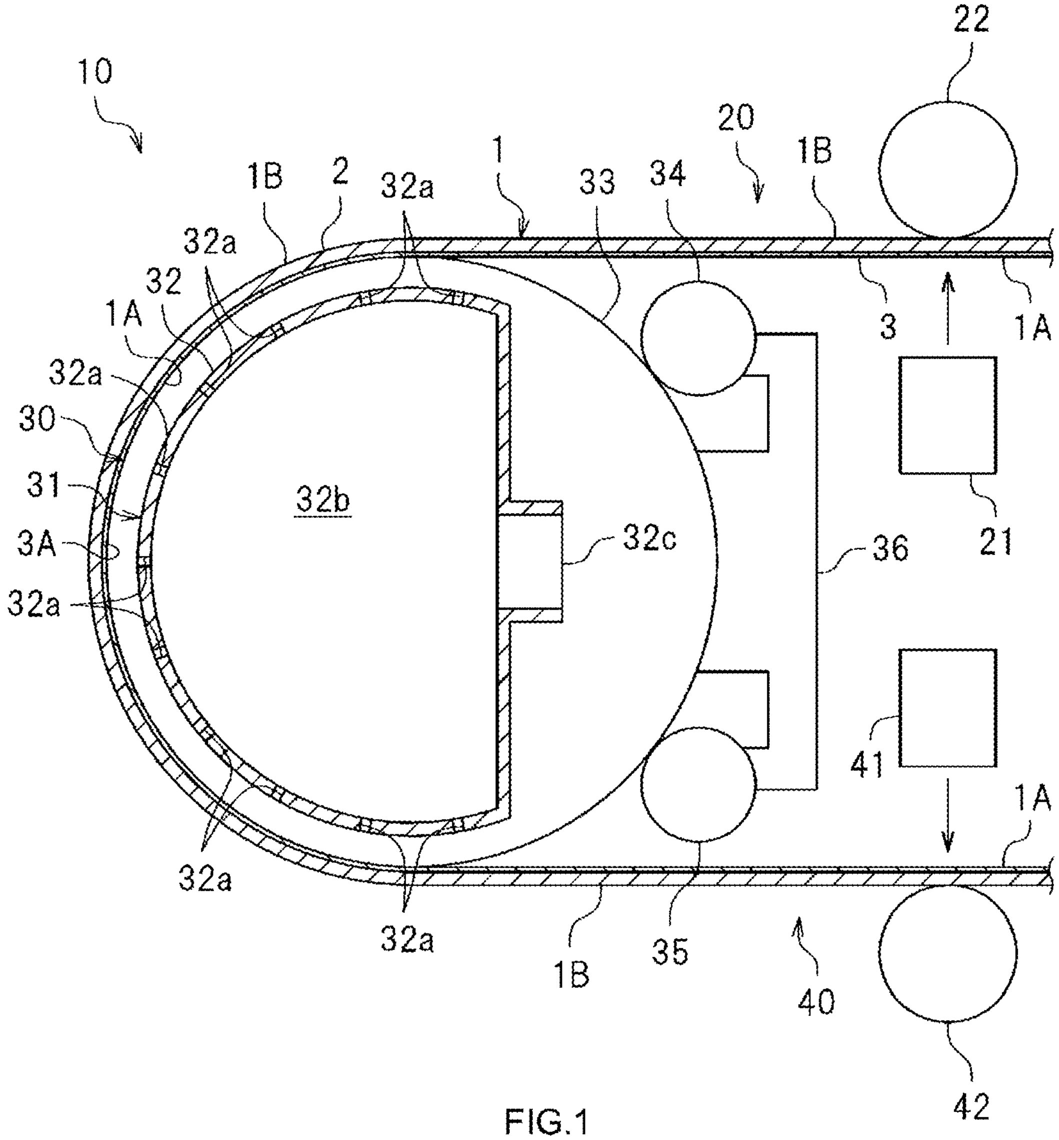
FIG. 1 is a schematic cross-sectional view of a sheet conveying apparatus.

FIG. 1 is a schematic cross-sectional view of a sheet conveying apparatus 10. The sheet conveying apparatus 10 is a device that conveys an electrode sheet 1 of an electricity storage device. In the present specification, "electricity storage device" is a term that refers to general devices capable of taking out electrical energy, and it is a concept that includes primary batteries and secondary batteries, as well as chemical batteries such as lithium-ion secondary batteries and nickel-hydrogen batteries, and physical batteries such as electric double layer capacitors.

As illustrated in FIG. 1, the sheet conveying apparatus 10 is configured to turn over the electrode sheet 1 during conveyance. The electrode sheet 1 is formed in a strip shape and includes an electrode foil 2 having one surface coated with a coating material 3 (paste) that contains an electrode active material. The electrode sheet 1 has a coated surface 1A coated with the coating material 3 and an uncoated surface 1B opposite to the coated surface 1A. The electrode sheet 1 has a pair of uncoated portions 4A not coated with the coating material 3, at both end portions of the coated surface 1A in its width direction (see FIGS. 2 and 3, and note that in FIGS. 2 and 3, the coated surface 1A is a bottom surface of the electrode sheet 1). Hereinafter, an area of the coated surface 1A that is coated with the coating material 3 is also referred to as a coated portion 3A. An illustrated portion of the sheet conveying apparatus 10 here is to convey the electrode sheet 1 with the coating material 3 in an undried state. However, the illustrated portion of the sheet conveying apparatus 10 may convey the electrode sheet 1 after the coating material 3 is dried.

As illustrated in FIG. 1, the sheet conveying apparatus 10 has a first conveying section 20 that conveys the electrode sheet 1, a turn section 30 provided downstream of the first conveying section 20, and a second conveying section 40 provided downstream of the turn section 30. The first conveying section 20 and the second conveying section 40 are here provided in a substantially horizontal manner. In the first conveying section 20, the electrode sheet 1 is conveyed with the coated surface 1A facing downward. The turn section 30 turns over the electrode sheet 1 with the coated surface 1A facing inward, so that the uncoated surface 1B faces downward. "Turning over" here means that the electrode sheet 1 is reversed such that its top surface and bottom surface are interchanged. The second conveying section 40 conveys the electrode sheet 1 with the uncoated surface 1B facing downward. The second conveying section 40 is disposed below the first conveying section 20.

The first conveying section 20 includes an upstream side air nozzle 21 that injects air toward the coated surface 1A of the electrode sheet 1. The first conveying section 20 is configured to be able to lift the electrode sheet 1 by the injected air. This prevents the undried (or post-dried) coating material 3 from touching the sheet conveying apparatus 10, thereby avoiding the peeling off of the coating material 3 or similar issues. The upstream side air nozzle 21 is disposed below a conveyance path for the electrode sheet 1 in the first conveying section 20 and injects air upward. An upstream side conveyance roller 22 is provided above the conveyance path for the electrode sheet 1 in the first conveying section 20. The upstream side conveyance roller 22 comes into contact with the uncoated surface 1B of the electrode sheet 1 and conveys the electrode sheet 1 downstream.

In the present embodiment, the upstream side air nozzle 21 is also a nozzle that injects air to dry the coating material 3. In the present embodiment, the electrode sheet 1 is dried while being conveyed by the sheet conveying apparatus 10. However, the sheet conveying apparatus 10 may convey the electrode sheet 1 with the coating material 3 in an undried state to a drying device separately installed.

The turn section 30 has a convex curved surface 31 along which the electrode sheet 1 is turned over. The turn section 30 is configured to blow out air from the convex curved surface 31 outward in the radial direction of the convex curved surface 31. Consequently, the coated portion 3A of the electrode sheet 1 is conveyed in a state of being spaced apart from the convex curved surface 31. By separating the coated portion 3A from the convex curved surface 31, damage to the coated portion 3A due to contact with the turn section 30 is prevented. The detailed configuration of the turn section 30 will be described in detail below.

The second conveying section 40 includes a downstream side air nozzle 41 that injects air toward the coated surface 1A of the electrode sheet 1. The downstream side air nozzle 41 is disposed above the conveyance path for the electrode sheet 1 in the second conveying section 40 and injects air downward. In the second conveying section 40, the electrode sheet 1 is conveyed with the coated surface 1A facing upward. A downstream side conveyance roller 42 is provided below the conveyance path for the electrode sheet 1 in the second conveying section 40. The downstream side conveyance roller 42 comes into contact with the uncoated surface 1B, which is positioned at the bottom side of the electrode sheet 1, and conveys the electrode sheet 1 downstream.

[Configuration of Turn Section]

Figure 2:
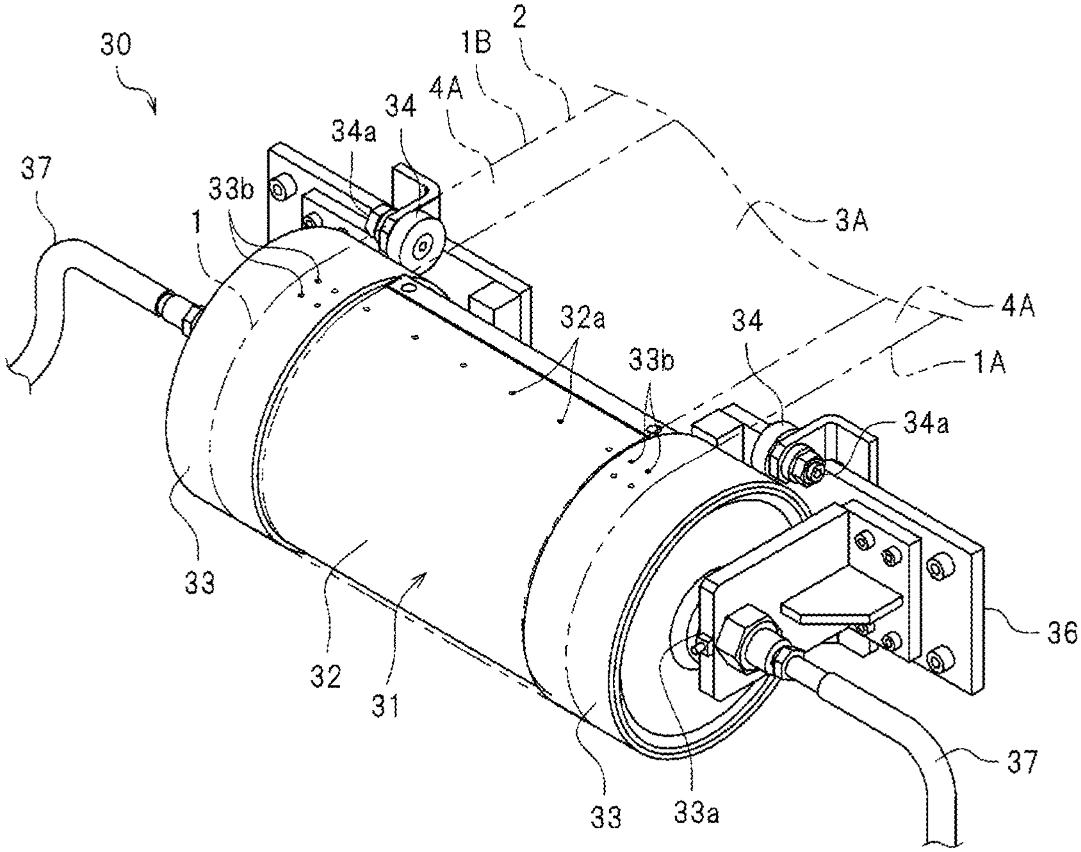
FIG. 2 is a perspective view of a turn section.
Figure 3:
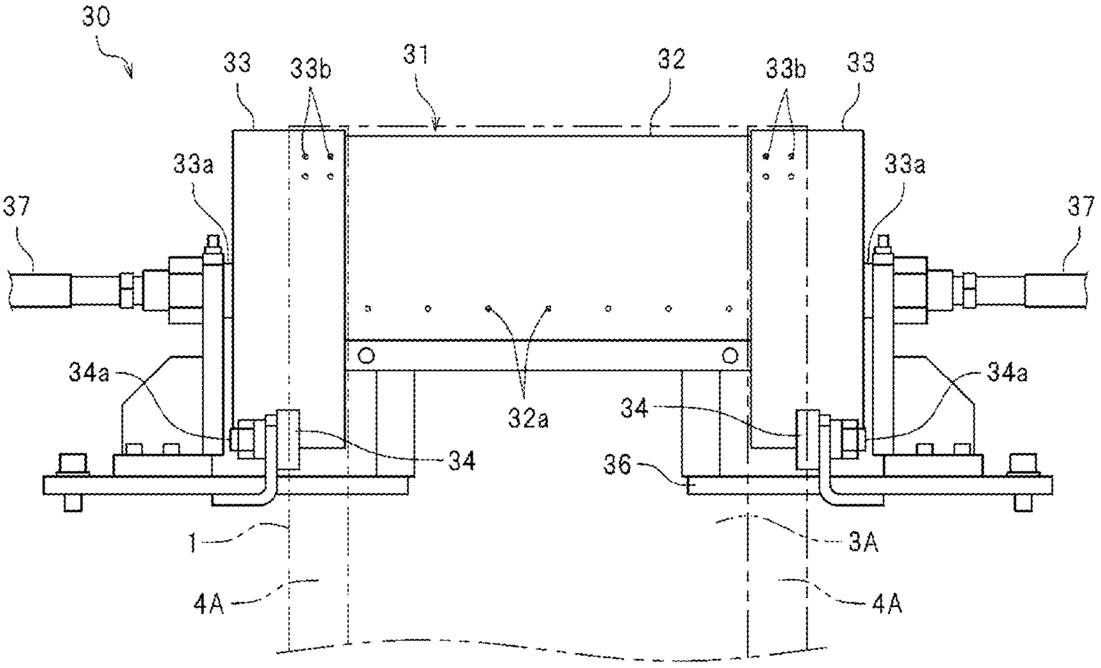
FIG. 3 is a plan view of the turn section.
Figure 4:
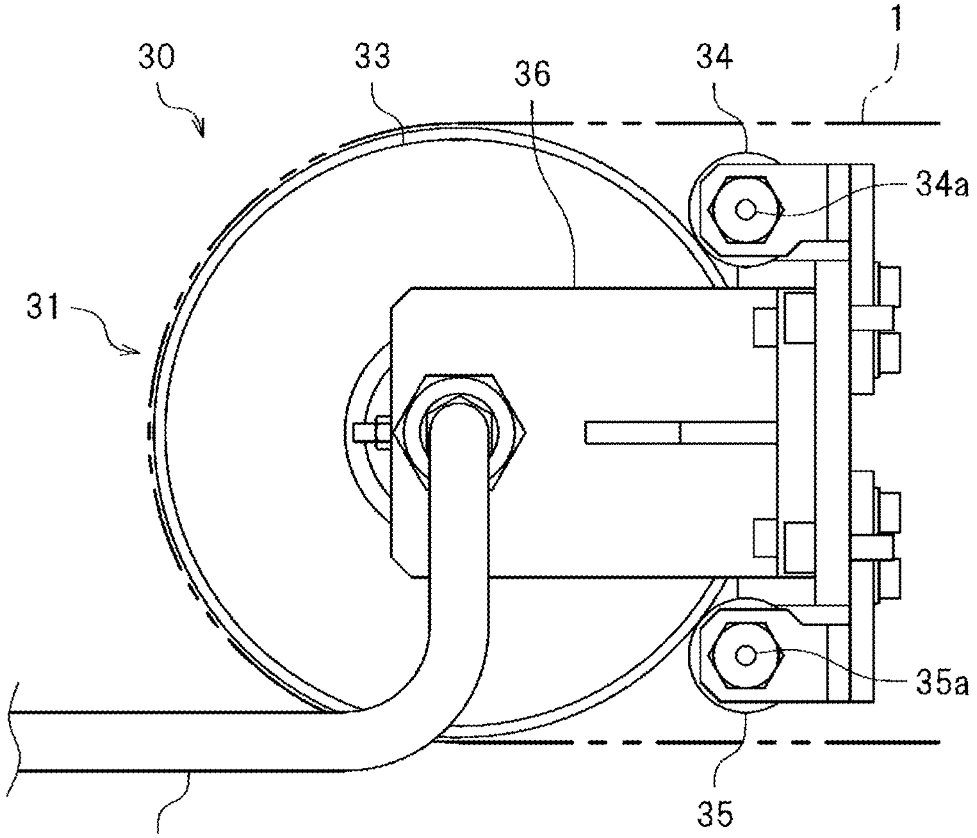
FIG. 4 is a side view of the turn section.

The configuration of the turn section 30 will be described below. FIG. 2 is a perspective view of the turn section 30. FIG. 3 is a plan view of the turn section 30. FIG. 4 is a side view of the turn section 30. As illustrated in FIGS. 2 to 4, the turn section 30 has the convex curved surface 31 that has its axis extending in the width direction of the electrode sheet 1. The turn section 30 turns over the electrode sheet 1 along the convex curved surface 31 such that the coated surface 1A faces inward. As illustrated in FIGS. 2 to 4, the convex curved surface 31 has a small-diameter portion 32, a pair of large-diameter portions 33 disposed on both sides of the small-diameter portion 32 in the axis direction (in the width direction of the electrode sheet 1), a pair of upstream side auxiliary rollers 34 being in contact with the pair of respective large-diameter portions 33, and a pair of downstream side auxiliary rollers 35 being in contact with the pair of respective large-diameter portions 33.

The small-diameter portion 32 is configured in a semi-circular shape that has its axis extending in the width direction of the electrode sheet 1. As illustrated in FIG. 1, the small-diameter portion 32 is configured to be hollow. Plural air nozzles 32*a* through which air is injected are formed in an arc portion of the small-diameter portion 32. Each air nozzle 32*a* here is a substantially circular through hole formed to penetrate the arc portion of the small-diameter portion 32, and communicates with an internal space 32*b* of the small-diameter portion 32. The air nozzles 32*a* are evenly disposed throughout the entire arc portion of the small-diameter portion 32. However, the shape and arrangement of the air nozzles 32*a* are not particularly limited. For example, some or all of the plural air nozzles 32*a* may be shaped to be elongated in the width direction of the electrode sheet 1. The plural air nozzles 32*a* may be disposed, for example, at a higher density on the upstream side of the electrode sheet 1 in the conveyance direction than on the downstream side.

As illustrated in FIG. 1, the small-diameter portion 32 includes an air introduction port 32*c* through which air is introduced into the internal space 32*b*. The air introduction port 32*c* is connected to an air blowing fan (not illustrated). The air supplied by the air blowing fan from the air introduction port 32*c* to the internal space 32*b* is injected from the air nozzles 32*a*. The air may be supplied by, for example, an air compressor that generates compressed air, instead of the air blowing fan.

As illustrated in FIG. 2, each of the large-diameter portions 33 in a pair is disposed at each of both sides of the small-diameter portion 32 in the axis direction and extends outward in the radial direction relative to the small-diameter portion 32. Each large-diameter portion 33 is configured concentrically with the small-diameter portion 32. The radius of each large-diameter portion 33 is larger than the radius of the small-diameter portion 32. A difference between the radius of the large-diameter portion 33 and the radius of the small-diameter portion 32 is preferably, for example, in the range of 1 mm and 5 mm. The pair of large-diameter portions 33 supports both end portions of the electrode sheet 1 in the width direction, more specifically, the uncoated portions 4A provided at both ends of the coated surface 1A. The electrode sheet 1 contacts the turn section 30 (large-diameter portions 33) at the uncoated portions 4A at both ends thereof. The coated portion 3A of the electrode sheet 1 contacts neither the small-diameter portion 32 nor the pair of large-diameter portions 33.

The pair of large-diameter portions 33 is configured to be rotatable around a rotary shaft 33*a* that extends in the axis direction (in the width direction of the electrode sheet 1). The turn section 30 includes a support member 36 that rotatably supports the pair of large-diameter portions 33. An outer portion of each large-diameter portion 33 in the axis direction is rotatably supported by the support member 36. In the present embodiment, each large-diameter portion 33 is supported on one side thereof by the support member 36. However, each large-diameter portion 33 may be rotatably supported also by the small-diameter portion 32. Here, the support member 36 non-rotatably supports the small-diameter portion 32.

As illustrated in FIG. 2, each large-diameter portion 33 is provided with plural suction holes 33*b* through which the air is drawn. Each large-diameter portion 33 is configured to be hollow and thus has an internal space (not illustrated). Each suction hole 33*b* here is a through hole that has a substantially circular shape and is formed to penetrate a circumferential surface of the large-diameter portion 33. The suction hole communicates with the internal space of the large-diameter portion 33. The plural suction holes 33*b* are disposed around the entire circumference of the large-diameter portion 33. However, the shape, arrangement, and the like of the suction holes 33*b* are not particularly limited.

The turn section 30 includes a pair of decompression pipes 37 that draws air out of each internal space of the pair of large-diameter portions 33. Each decompression pipe 37 is connected to the rotary shaft 33*a* of the large-diameter portion 33 and communicates with the internal space of the large-diameter portion 33. A fan (not illustrated) is connected to the other end of each decompression pipe 37. When the fan is driven, the pressure in the internal space of the large-diameter portion 33 is reduced, so that outside air is drawn in from the plural suction holes 33*b* formed on the circumferential surface of the large-diameter portion 33. Thus, the electrode sheet 1 (in detail, uncoated portion 4A), supported by the large-diameter portions 33, is adsorbed onto the large-diameter portions 33.

The pair of upstream side auxiliary rollers 34 is configured to be rotatable around respective rotary shafts 34*a* extending in parallel with the rotary shaft 33*a* of the pair of large-diameter portions 33. The support member 36 rotatably supports the pair of upstream side auxiliary rollers 34. The pair of upstream side auxiliary rollers 34 is in contact with the pair of respective large-diameter portions 33. Thus, the pair of upstream side auxiliary rollers 34 rotates in a driven manner when the pair of large-diameter portions 33 rotates. The pair of upstream side auxiliary rollers 34 here are provided upstream of the electrode sheet 1 in the conveyance direction, relative to the small-diameter portion 32. The upstream side auxiliary rollers 34 are disposed above the central axes of the small-diameter portion 32 and the large-diameter portion 33 (rotary shaft 33*a* of the large-diameter portion 33). The pair of upstream side auxiliary rollers 34 is in contact with a semicircular arc portion of the large-diameter portion 33, which is opposite to the semicircular arc portion thereof that supports the electrode sheet 1 (semicircular arc portion disposed so as to be aligned with the small-diameter portion 32). The pair of upstream side auxiliary rollers 34 restrains the rotation of the large-diameter portion 33 from wobbling around the rotary shaft 33*a*. The pair of upstream side auxiliary rollers 34 receives the large-diameter portion 33 pushed by the electrode sheet 1 to the side of the first conveying section 20 (to the right in FIG. 1), thereby restraining the wobble of the large-diameter portion 33 during rotation.

The pair of downstream side auxiliary rollers 35 is also configured to be rotatable around respective rotary shafts 35*a* that extend in parallel with the rotary shaft 33*a* of the pair of large-diameter portions 33. The support member 36 rotatably supports the pair of downstream side auxiliary rollers 35. The pair of downstream side auxiliary rollers 35 is also in contact with the pair of respective large-diameter portions 33. Thus, when the large-diameter portions 33 rotate, the downstream side auxiliary rollers 35 also rotate in a driven manner. The pair of downstream side auxiliary rollers 35 is provided downstream of the electrode sheet 1 in the conveyance direction, relative to the small-diameter portion 32. The pair of downstream side auxiliary rollers 35 is disposed below the central axes of the small-diameter portion 32 and the large-diameter portion 33 (rotary shaft 33*a* of the large-diameter portion 33). The pair of downstream side auxiliary rollers 35 is also in contact with a semicircular arc portion of the large-diameter portion 33, which is opposite to the semicircular arc portion thereof that supports the electrode sheet 1. The pair of downstream side auxiliary rollers 35 restrains the rotation of the large-diameter portion 33 from wobbling around the rotary shaft 33*a*, together with the upstream side auxiliary rollers 34. Note that the upstream side auxiliary rollers 34 may not be provided as two separate rollers corresponding to the pair of large-diameter portions 33. Instead, a single, elongated roller may be used. The same applies to the downstream side auxiliary rollers 35.

[Functions and Effects of Embodiments]

The following describes the functions and effects that can be exerted by the sheet conveying apparatus 10 according to the present embodiment.

The sheet conveying apparatus 10 according to the present embodiment includes: the first conveying section 20 that conveys the strip-shaped electrode sheet 1 having the coated surface 1A and the uncoated surface 1B opposite to the coated surface 1A, with the coated surface 1A facing downward; the turn section 30 provided downstream of the first conveying section 20 and having the convex curved surface 31 that has an axis thereof extending in the width direction of the electrode sheet 1, the turn section 30 being configured to turn over the electrode sheet 1 along the convex curved surface 31 such that the coated surface 1A faces inward; and the second conveying section 40 provided downstream of the turn section 30 and configured to convey the electrode sheet 1 with the uncoated surface 1B facing downward. The convex curved surface 31 includes: the small-diameter portion 32 where the air nozzles 32*a* for injecting air are formed; and the pair of large-diameter portions 33 disposed on both sides of the small-diameter portion 32 in the axis direction thereof and extending outward in the radial direction relative to the small-diameter portion 32 to support both end portions of the electrode sheet 1 in the width direction thereof.

With this configuration, air is injected from the air nozzles 32*a* of the small-diameter portion 32, and both end portions of the electrode sheet 1 in the width direction are supported by the pair of large-diameter portions 33 disposed at both ends of the small-diameter portion 32, thereby enabling a portion of the electrode sheet 1 (here, the coated portion 3A) facing the small-diameter portion 32 to surely lift off from the small-diameter portion 32. In detail, a gap is created between the coated portion 3A of the electrode sheet 1 and the small-diameter portion 32 by supporting the electrode sheet 1 using the large-diameter portions 33 extending outward in the radial direction relative to the small-diameter portion 32. Thus, the coated portion 3A is spaced apart from the small-diameter portion 32. The contact between the electrode sheet 1 and the large-diameter portion 33 reduces air discharge from both sides of the electrode sheet 1 in the width direction, thus improving the buoyancy of the air injected from the small-diameter portion 32. This makes it less likely for the electrode sheet 1 to come into contact with the turn section 30. As a result, the risk of damage to the coated portion 3A due to the contact with the turn section 30 can be reduced.

In the present embodiment, the electrode sheet 1 has the pair of uncoated portions 4A not coated with the coating material 3, at both end portions of the coated surface 1A in its width direction. The pair of large-diameter portions 33 supports the uncoated portions 4A. With this configuration, the portions of the electrode sheet 1 supported by the large-diameter portions 33 are not coated with the coating material 3. Thus, the damage to the coating material 3 due to the contact with the large-diameter portions 33 can be prevented.

In the present embodiment, the pair of large-diameter portions 33 is configured to be rotatable around the rotary shaft 33*a* that extends in the axis direction. With this configuration, the pair of large-diameter portions 33 rotates in a driven manner along with the conveyance of the electrode sheet 1. This suppresses elongation of the uncoated portions 4A due to a tension generated when the electrode sheet is wound on the large-diameter portions 33. The turn section 30 may include a drive unit that rotates the pair of large-diameter portions 33 according to the conveyance speed of the electrode sheet 1.

In the present embodiment, the pair of large-diameter portions 33 is provided with the suction holes 33*b*, through which the air is drawn in. With this configuration, the electrode sheet 1 is adsorbed onto and adheres to the large-diameter portions 33. Thus, the electrode sheet 1 is surely supported by the large-diameter portions 33. In addition, air leakage from both sides of the electrode sheet 1 in the width direction can be reduced, further enhancing the buoyancy of air injected from the small-diameter portion 32.

The sheet conveying apparatus 10 according to the present embodiment includes the pair of upstream side auxiliary rollers 34 configured to be rotatable around the respective rotary shafts 34*a* parallel to the rotary shaft 33*a* of the pair of large-diameter portions 33, the upstream side auxiliary rollers 34 being in contact with the pair of respective large-diameter portions 33. With this configuration, the rotation of the large-diameter portion 33 can be restrained from wobbling around the rotary shaft 33*a*. By further providing the pair of downstream side auxiliary rollers 35, the wobble of the rotation of the large-diameter portions 33 can be restrained more effectively.

The sheet conveyed in the present embodiment is the electrode sheet 1 with the coated surface 1A, which is coated with the coating material 3 (paste) containing the electrode active material. The sheet conveying apparatus 10 according to the present embodiment can be suitably used for conveyance of such an electrode sheet 1.

One embodiment of the sheet conveying apparatus proposed herein has been described above. However, the above embodiment is illustrative only and can also be implemented in other forms. The embodiments described above do not limit the present invention unless otherwise specified. The technology disclosed herein can be modified in various ways, and each component and each process mentioned herein can be omitted or combined as appropriate, as long as no special problems arise.

For example, the sheet conveying apparatus is not limited to one that conveys electrode sheets of electric storage devices, but may also be one that conveys other strip-shaped sheets. For example, the small-diameter portion may be formed in an arc shape that either exceeds or is short of a semicircle. The first conveying section may be configured to convey the sheet with the coated portion facing downward and may convey the sheet in any direction other than the horizontal direction. The second conveying section may be configured to convey the sheet with the coated portion facing upward and may convey the sheet in any direction other than the horizontal direction.

For example, the large-diameter portion may be configured to be non-rotatable. Even when the large-diameter portion does not rotate, the sheet conveying apparatus can still exert the function and effect of reducing the risk of damage to the coated portion caused by contact between the electrode sheet and the turn section.

The present specification also includes the disclosures set forth in the following respective items.

Item 1:

A sheet conveying apparatus, comprising:

a first conveying section that conveys a strip-shaped sheet having a first surface and a second surface opposite to the first surface, with the first surface facing downward;

a turn section provided downstream of the first conveying section and having a convex curved surface that has an axis thereof extending in a width direction of the sheet, the turn section being configured to turn over the sheet along the convex curved surface such that the first surface faces inward; and a second conveying section provided downstream of the turn section and configured to convey the sheet with the second surface facing downward, wherein the convex curved surface includes:

a small-diameter portion where air nozzles for injecting air are formed; and a pair of large-diameter portions disposed on both sides of the small-diameter portion in an axis direction and extending outward in a radial direction relative to the small-diameter portion to support both end portions of the sheet in the width direction thereof.

Item 2:

The sheet conveying apparatus according to Item 1, wherein the sheet has a pair of uncoated portions not coated with the coating material, at both end portions of the first surface in the width direction, and the pair of large-diameter portions supports the uncoated portions.

Item 3:

The sheet conveying apparatus according to Item 1 or 2, wherein the pair of large-diameter portions is configured to be rotatable around a rotary shaft extending in the axis direction.

Item 4:

The sheet conveying apparatus according to Item 3, wherein the pair of large-diameter portions is provided with suction holes, through which air is drawn in.

Item 5:

The sheet conveying apparatus according to Item 3 or 4, further comprising:

a pair of auxiliary rollers configured to be rotatable around a rotary shaft extending in parallel with the rotary shaft of the pair of large-diameter portions, the auxiliary rollers being in contact with the pair of respective large-diameter portions.

Item 6:

The sheet conveying apparatus according to any one of Items 1 to 5, wherein the sheet is an electrode sheet having the first surface coated with a paste containing an electrode active material.

What is claimed is:

1. A sheet conveying apparatus, comprising:

a first conveying section configured to convey a strip-shaped sheet having a first surface and a second surface opposite to the first surface, with the first surface facing downward;

a turn section provided downstream of the first conveying section and having a convex curved surface that has an axis thereof extending in a width direction of the strip-shaped sheet, the turn section configured to turn over the strip-shaped sheet along the convex curved surface such that the first surface faces inward; and a second conveying section provided downstream of the turn section and configured to convey the strip-shaped sheet with the second surface facing downward, wherein the convex curved surface includes:

a small-diameter portion where air nozzles for injecting air are formed; and a pair of large-diameter portions disposed on both sides of the small-diameter portion in an axis direction of the axis of the convex curved surface and extending outward in a radial direction of the convex curved surface relative to the small-diameter portion to support both end portions of the strip-shaped sheet in the width direction thereof, each of the pair of the large-diameter portions is hollow and has an internal space, each of the pair of large-diameter portions is configured to be rotatable about a corresponding rotary shaft extending in the axis direction, and is provided with suction holes, through which air is drawn in the internal space, the turn section includes a pair of decompression pipes each configured to draw out the air in the internal space of a corresponding large-diameter portion of the pair of large-diameter portions, and each of the pair of decompression pipes is connected to the rotary shaft of the corresponding large-diameter portion and communicates with the internal space of the corresponding large-diameter portion.

2. The sheet conveying apparatus according to claim 1, wherein the strip-shaped sheet has a pair of uncoated portions not coated with a coating material, at the both end portions of the strip-shaped sheet on the first surface in the width direction, and the pair of large-diameter portions is configured to support the pair of uncoated portions.

3. The sheet conveying apparatus according to claim 1, further comprising:

a pair of auxiliary rollers configured to be rotatable around a further rotary shaft extending in parallel with the rotary shaft of each of the pair of large-diameter portions, the pair of auxiliary rollers being in contact with the pair of large-diameter portions, respectively.

4. The sheet conveying apparatus according to claim 1, wherein the strip-shaped sheet is an electrode sheet having the first surface coated with a paste containing an electrode active material.

* * * * *